United States Patent [19]
Nakagawa et al.

[11] 3,826,140
[45] July 30, 1974

[54] TEMPERATURE RECORDER

[76] Inventors: George Nakagawa, P.O. Box 4145, Modesto, Calif. 95353; Bill Youmans, Box 875, Zephyr Cove, Nev. 89448

[22] Filed: July 23, 1973

[21] Appl. No.: 382,078

[52] U.S. Cl............. 73/343.5, 346/33 TP, 346/111
[51] Int. Cl...... G01k 1/02, G01d 9/12, G01d 15/28
[58] Field of Search......... 73/343.5; 346/33 TP, 111

[56] References Cited
UNITED STATES PATENTS

| | | | |
|---|---|---|---|
| 164,275 | 6/1875 | Draper | 73/343.5 |
| 974,756 | 11/1910 | Diescher | 346/111 X |
| 2,926,058 | 2/1960 | Phillips | 346/111 |
| 3,119,269 | 1/1964 | Hiscock | 73/343.5 |
| 3,268,909 | 8/1966 | Green | 346/111 |

Primary Examiner—Richard C. Queisser
Assistant Examiner—Frederick Shoon
Attorney, Agent, or Firm—Roger B. Webster

[57] ABSTRACT

A temperature recorder which produces a continuous graphic record, scribed on tape, of the temperature existing in an enclosure (such as a refrigerated railroad car) curing a given period of time (e.g., the transit time of such a railroad car). The recorder comprises a guided, downwardly movable case—suspended by an upper-end anchored tape—which slowly gravitationally descends upon unwinding, under influence of the weight of said case and at a controlled rate, of the tape from a spool on such case, and the latter being fitted with a temperature-responsive device including a variably movable stylus which progressively scribes on the tape as the case so descends; the tape having a graph thereon which reflects the scribing in terms of temperature in relation to time.

13 Claims, 7 Drawing Figures

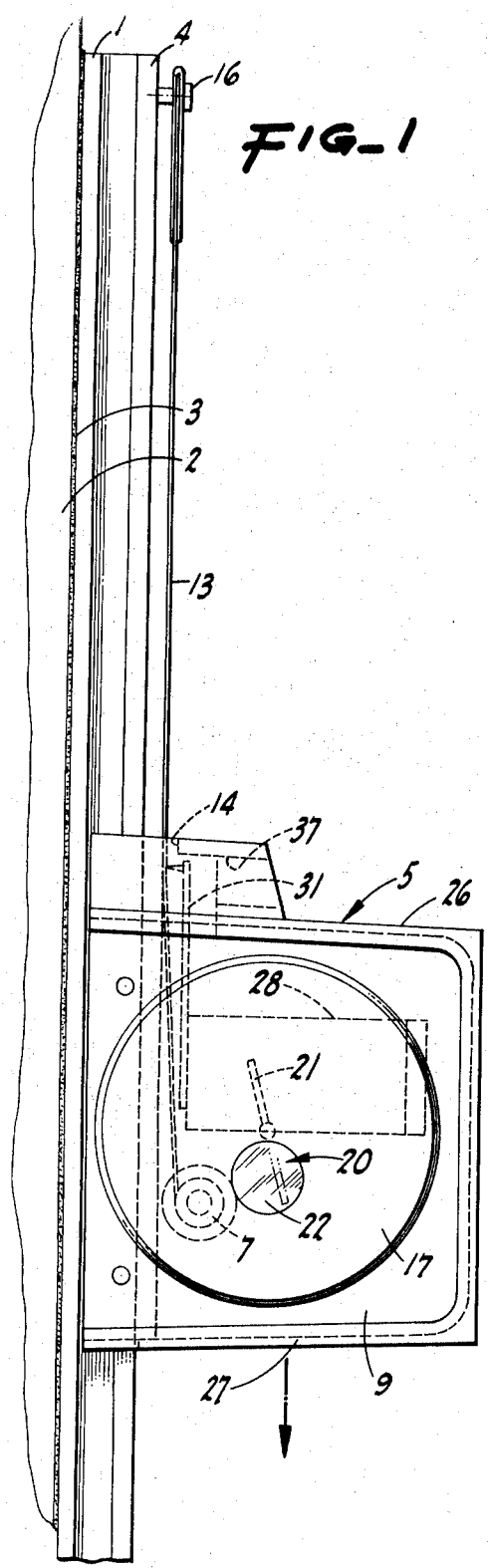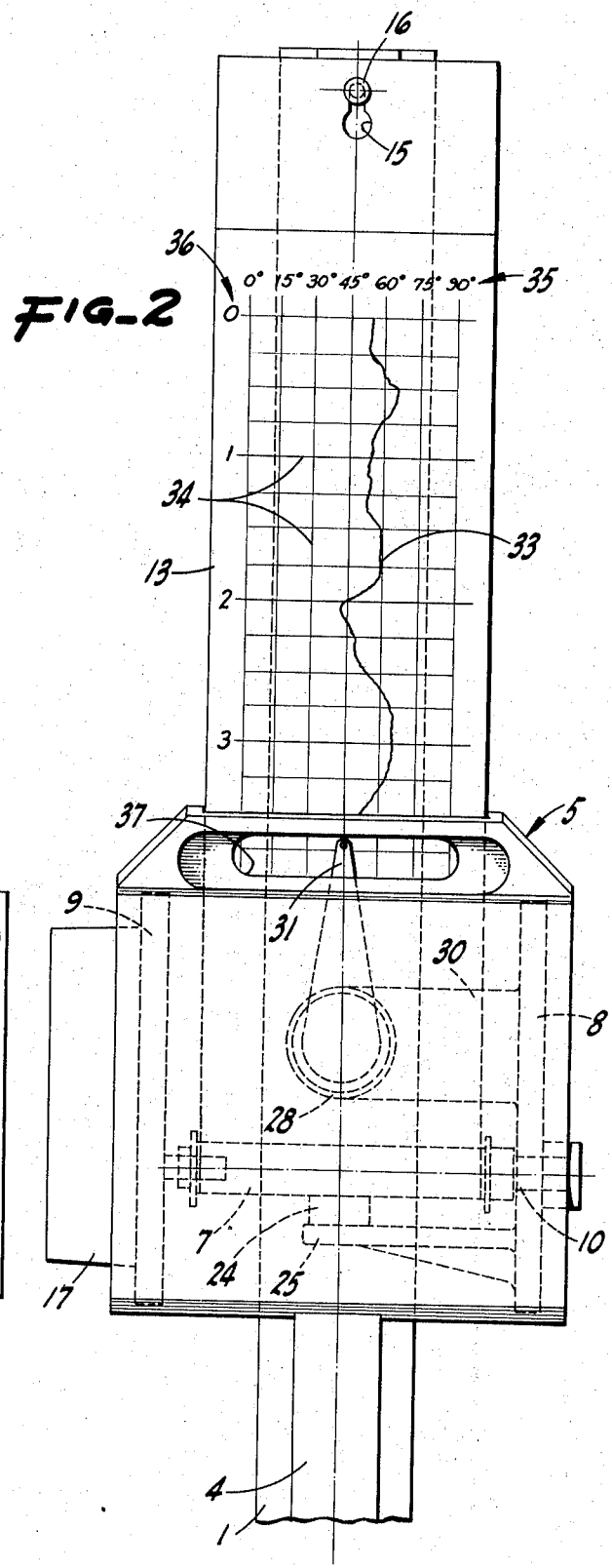

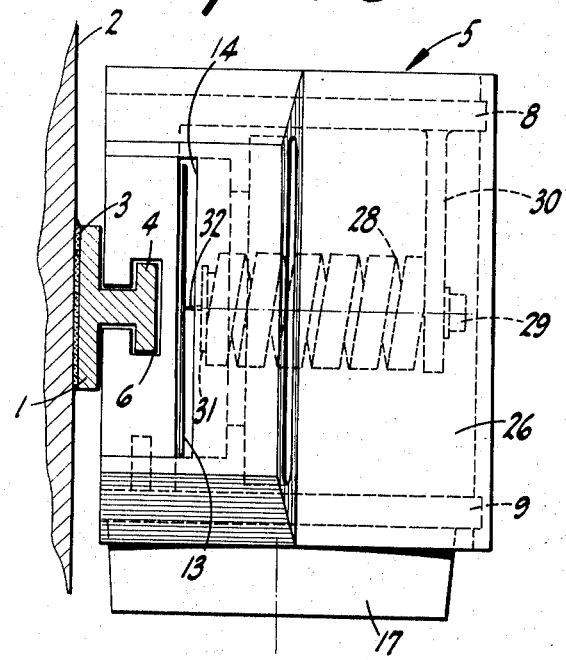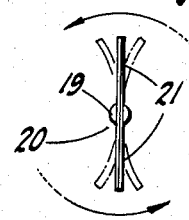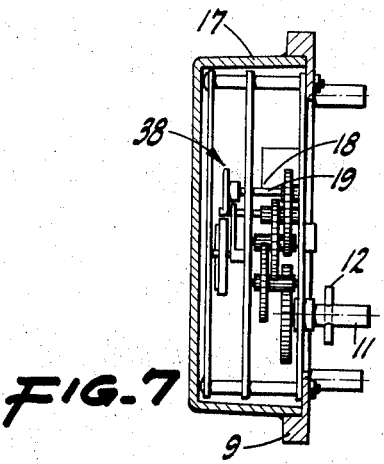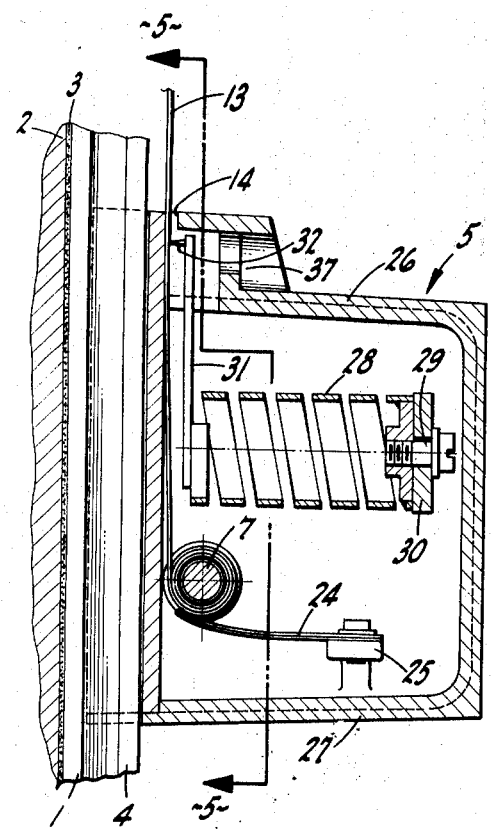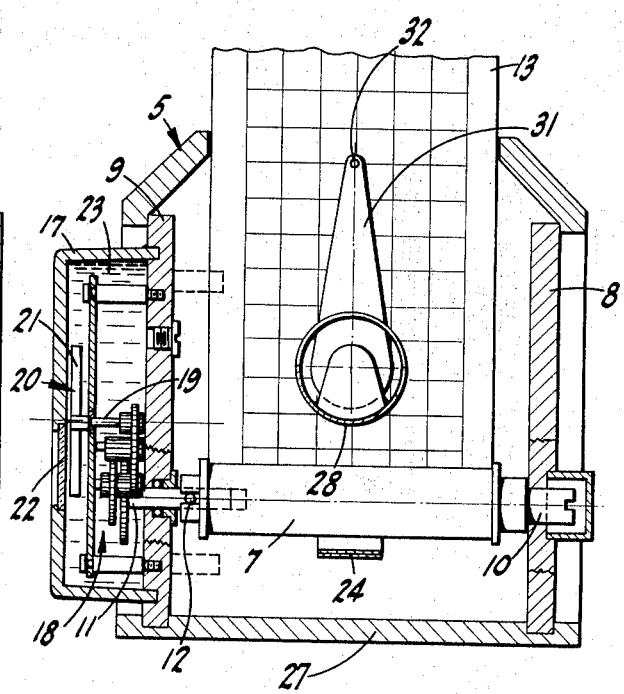

TEMPERATURE RECORDER

BACKGROUND OF THE INVENTION

In certain business activities it is desired that a graphic record be provided of the temperature which exists in an enclosure during a given period of time. A notable example is the shipment in a refrigerated railroad car of fresh produce (fruit and vegetables); it being desirable, if not requisite, that there be known, and by way of graphic record, the temperature which existed at any point of time during transit of such railroad car to its destination. Heretofore, certain devices have been provided for the purpose, but these have not, within the realm of economical manufacture and effective operation, been wholly successful. The present invention was conceived in a successful effort to meet such requirements.

SUMMARY OF THE INVENTION

The present invention provides, as a major object, a novel, inexpensive, and highly effective temperature recorder operative to produce a continuous graphic record—scribed on tape—of the temperature existing in an enclosure (such as a refrigerated railroad car) during a given period of time (e.g., the transit time of such a railroad car).

The present invention provides, as another important object, a temperature recorder, as above, which comprises a guided, downwardly movable case—suspended by an upper end anchored tape—which slowly gravitationally descends upon unwinding, under influence of the weight of said case and at a controlled rate, of the tape from a spool on such case, and the latter being fitted with a temperature-responsive device including a variably movable stylus which progressively scribes on the tape as the case so descends; the tape having a graph thereon which reflects the scribing in terms of temperature in relation to time.

The present invention provides, as an additional important object, a temperature recorder, as in the preceding paragraph, in which the rate of unwinding of the tape from the spool is controlled by a novel mechanism which includes a speed-changing gear train and associated parts which preclude tape-unwinding rotation of the spool at any other than an extremely low rate, and so that the recorder has—with a tape not of undue length—a recording span of a number of days.

The present invention provides, as a further object, a temperature recorder which is designed for ease and economy of manufacture, and convenience of installation.

The present invention provides, as a still further object, a practical, reliable, and durable temperature recorder, and one which is exceedingly effective for the purpose for which it is designed.

BRIEF DESCRIPTION OF THE DRAWINGS

FIG. 1 is a side elevation of the temperature recorder as in use.

FIG. 2 is a front elevation thereof.

FIG. 3 is a top plan, with the mounting bar and included rail in section.

FIG. 4 is a sectional elevation taken in a front-to-back vertical plane.

FIG. 5 is a transverse sectional elevation on line 5—5 of FIG. 4.

FIG. 6 is an elevation of the paddle wheel on the output shaft of the speed-changing gear train.

FIG. 7 shows, in a fragmentary sectional elevation and as a modification, a clock-type escapement (in lieu of the paddle wheel) on the output shaft of the speed-changing gear train.

DESCRIPTION OF THE PREFERRED EMBODIMENT

Referring now more particularly to the drawings and to the characters of reference marked thereon, and at present to FIGS. 1 – 6, inclusive, the temperature recorder comprises a vertical mounting bar 1 adapted to be secured to a wall 2, in an enclosure such as a refrigerated railroad car, by an adhesive backing 3. The bar 1 includes a vertical, outwardly disposed T-shaped guide rail 4.

A small, box-like case, indicated generally at 5, is guided on the rail 4 for free-sliding descent from an initially raised position adjacent the upper end of bar 1; the case 5 having a vertical T-shaped slot 6 therein, and in which the rail 4 is matchingly but relatively slidably received.

A horizontal, transverse spool 7 is rotatively disposed in the case 5, and spans between its sidewalls 8 and 9; the spool at one end being journaled, as at 10, in the sidewall 8, while at the other end the spool is supported by a projecting portion of a rotative shaft 11 (hereinafter more specifically defined) which extends in sealed relation through the sidewall 9. A shear pin 12 normally connects the spool 7 to the shaft 11.

A relatively wide, flat-faced tape 13 is initially wound—for substantially its full length—on the spool 7, but with a short unwound or lead portion extending upwardly from the spool 7, through a top slot 14 in the case 5, and thence to an upper end termination above said case. The upper end portion of the tape includes a bayonet slot 15 which receives a headed pin 16 projecting from the upper end of rail 4. In this way, the tape is upper-end anchored, and thus depends from a vertically fixed point.

Under the influence of the weight of case 5 (and the parts thereon), such case gravitationally descends on the guide rail 4, and this results in unwinding of the tape 13 from the spool 7; such descent being extremely slow (the full descent requiring several days) as it occurs at a rate controlled by the following mechanism on the case:

A closure cup 17 is attached, in sealed relation, to the outside of the sidewall 9, and a speed-changing gear train 18 is mounted in connection with such sidewall 9 within the enclosure defined by such cup 17. The shaft 11 comprises the low-speed input shaft of the gear train 18, and such shaft passes through sidewall 9 in rotative but sealed relation. The relatively higher-speed output shaft 19 of the gear train 18 lies within the confines of the cup-formed enclosure, and is fitted with a paddle wheel 20 comprised of radial, flat-faced paddles 21 disposed in opposition. Operation of the paddle wheel 20 can be viewed through a transparent window 22 in the outer side of cup 17.

Such cup 17 is filled with a viscous fluid 23 in which the paddle wheel 20 runs; such fluid moderating the speed at which said paddle wheel can rotate. In order to assure that such speed remains substantially constant during periods in which the temperature lowers or rises relative to a normal temperature, and during which periods the fluid 23 becomes, respectively, more or less viscous, the paddles are bi-metallic and disposed so that they assume a forwardly facing, less resistant, convex form when the temperature lowers and the fluid 23 becomes more viscous, and assume a forwardly facing, more resistant, concave form when the temperature rises and the fluid 23 becomes less viscous. With such temperature-responsive changes in the configuration of the paddles, the paddle wheel 20 is maintained at a substantially constant speed while driven by the gear train 18; the latter being actuated by rotation of the spool 7 caused by unwinding of tape 13 therefrom as the case 5 gravitationally descends on guide rail 4.

The gear train 18, together with the paddle wheel 20 immersed in the viscous fluid 23, with the paddles 21 characterized as described above, normally effectively control the rate of unwinding of the tape 13 from the spool 7, and consequently the rate of descent of the case 5; the full descent of the case consuming, as already indicated, a number of days.

If necessary, and as a supplementary means of maintaining a constant rate of unwinding of the tape 13 from the spool 7, a flat-faced finger 24 is mounted in the case 5 on a bracket 25, and bears in friction-drag relation on the tape wound on said spool; the finger 24 being bi-metallic and arranged to exert less friction drag or more friction drag upon the temperature lowering or rising, respectively, relative to a normal temperature.

As the case 5 constantly slowly descends in the enclosure (such as a refrigerated railroad car) in which the recorder is mounted, the temperature therein is continuously and graphically recorded in relation to the passage of time; this being accomplished as follows:

Intermediate the top 26 and the bottom 27 of case 5, and within the confines thereof, there is an elongated thermometer coil 28 of bi-metallic helical form; the coil being horizontal and extending lengthwise in a front-to-back direction above the spool 7. At its front end, the coil is secured by a bolt 29 to a bracket 30 fixed in said case 5.

The rear and free end of the thermometer coil 28 terminates adjacent but short of the part of tape 13 unwound in the case 5 from spool 7, and at such rear end the coil is fitted with an upstanding radial stylus 31 having a scribing point 32 on its outer end; such scribing point projecting toward and bearing on the adjacent face of said part of the tape 13.

Under conditions of varying temperatures, the thermometer coil imparts limited rotative motion, about the axis of said coil, to the stylus 31 whereby the scribing point 32 correspondingly oscillates transversely on the tape; the latter being surfaced with a material which reflects the action of said scribing point 32. The scribing point 32 thus produces, on the adjacent face of the tape, a vertically extending, laterally undulating line 33 upon the case gradually descending.

The line 33, as so scribed, appears on a graph 34 whose vertical columns represent temperatures, and whose horizontal columns represent the passage of time. The vertical or temperature columns of the graph correspond to and are identified by a horizontal row 35 of temperature-indicating numerals, while certain of the horizontal or passage-of-time columns correspond to and are identified by a vertical row 36 of day-indicating numerals; the latter being vertically spaced apart a distance equal to that which the case descends in each 24 hour period.

With the graph characterized as above, the scribed line 33 can, at any point in its length, be read in terms of temperature in relation to time. For example, when the recorder is used in a refrigerated railroad car, the scribed line indicates the temperature which existed, at any point in time, during transit of the railroad car to its destination.

Also, when the recorder is in operation, the point on the graph can be seen through a transverse window 37 in a raised part of the top of the case.

While it is contemplated that the described temperature recorder will, in practice, be provided for single use only and disposable thereafter, it is desired, however, that the tape be first removed and kept as a permanent record. This is accomplished by detaching the tape from pin 16 and then pulling on said tape to unwind the remainder from the spool. When the tape is so pulled, the pin 12 readily shears so that the gear train 18 does not impede such unwinding of the tape from the spool.

In the modification shown in FIG. 7, and which modification relates to the means to moderate the speed of the output shaft 19, the gear train 18 and associated parts are the same as in the embodiment of FIGS. 1 - 6, inclusive, except that—in lieu of paddle wheel 20—a non-immersed clock-type escapement 38 is coupled to said output shaft 19 and effectively maintains it at a constant speed. Also, when the escapement 38 is used with the gear train 18, the friction-drag finger 24 is omitted from the recorder.

In either embodiment of the speed-moderating device (i.e., the paddle wheel 20 or the clock-type escapement 38), the case is permitted to gravitationally descend only at a slow and controlled rate, and as necessary to the reasonable accuracy of the temperature recording produced graphically on the tape.

From the foregoing description, it will be readily seen that there has been produced such a temperature recorder as substantially fulfills the objects of the invention, as set forth herein.

While this specification sets forth in detail the present and preferred construction of the temperature recorder, still in practice such deviations from such detail may be resorted to as do not form a departure from the spirit of the invention as defined by the appended claims.

We claim:

1. A temperature recorder—adapted to produce a continuous graphic temperature record scribed on tape—comprising a case, a spool on the case, a tape wound on the spool and thence extending upwardly in case-suspending relation and to an upper-end anchor on a fixed object, the case gravitationally descending upon unwinding of the tape from the spool under the influence of the weight of such case, a mechanism associated with the case arranged to control the rate of such unwinding of the tape from the spool, and a case-mounted temperature-responsive device including a variably movable stylus operative to scribe on the tape as the case descends, the scribing reflecting temperature in relation to time.

2. A temperature recorder, as in claim 1, including means mounted on such fixed object and guiding the case in its descent.

3. A temperature recorder, as in claim 1, including a rail secured to such fixed object; the case being guided, in its descent, on such rail.

4. A temperature recorder, as in claim 1, in which said mechanism includes a speed-changing gear train having a low-speed input shaft and a relatively higher-speed output shaft, the spool being coupled to the input shaft of the gear train, and a speed-moderating device coupled to the output shaft of said gear train.

5. A temperature recorder, as in claim 4, in which the speed-moderating device includes a paddle wheel on said output shaft, the case having an enclosure in which the paddle wheel is rotatively disposed, and a fluid in such enclosure moderating the speed of rotation of the paddle wheel in such fluid.

6. A temperature recorder, as in claim 5, in which the fluid in the enclosure is of a kind which becomes more viscous or less viscous upon the fluid temperature lowering or rising, respectively, relative to a normal temperature; the paddle wheel including radial paddles, and said paddles being bi-metallic and presenting a forwardly convex or a forwardly concave configuration upon the fluid temperature so lowering or rising, respectively, whereby the speed of the paddle wheel is maintained substantially constant.

7. A temperature recorder, as in claim 5, including a flat-faced finger mounted on the case and bearing, with a friction drag, on the tape wound on the spool.

8. A temperature recorder, as in claim 7, in which said finger is bi-metallic whereby, upon the temperature lowering relative to a normal temperature, the finger exerts a lesser friction drag on the tape wound on the spool; and, upon the temperature rising relative to a normal temperature, the finger exerts a greater friction drag on the tape wound on the spool.

9. A temperature recorder, as in claim 4, in which the speed-moderating device is a clock-type escapement.

10. A temperature recorder, as in claim 1, in which the temperature-responsive device comprises a thermometer coil fixed at one end in connection with the case and free at the other end; the stylus being secured to said free end of the thermometer coil.

11. A temperature recorder, as in claim 10, in which the thermometer coil is of bi-metallic, helical type.

12. A temperature recorder, as in claim 10, in which the thermometer coil is of elongated, helical form, disposed substantially horizontally, and projects from said one end thereof toward, and to a termination at said other end adjacent, the face of an unwound portion of the tape; the stylus radiating from such other end of the thermometer coil, and said stylus being formed at its outer end with a scribing point bearing on said face of the tape.

13. A temperature recorder, as in claim 1, in which the tape is graph-marked vertically in terms of time, and horizontally in terms of temperature.

* * * * *